(12) United States Patent
Landwehr et al.

(10) Patent No.: US 8,020,450 B2
(45) Date of Patent: Sep. 20, 2011

(54) PRESSURE GAUGE

(75) Inventors: Horst Landwehr, Hanau (DE); Holger Glaab, Goldbach (DE)

(73) Assignee: Wika Alexander Wiegand GmbH & Co. KG, Klingenberg (DE)

( * ) Notice: Subject to any disclaimer, the term of this patent is extended or adjusted under 35 U.S.C. 154(b) by 9 days.

(21) Appl. No.: 12/504,247

(22) Filed: Jul. 16, 2009

(65) Prior Publication Data
US 2010/0011870 A1 Jan. 21, 2010

(30) Foreign Application Priority Data

Jul. 18, 2008 (DE) .......................... 10 2008 040 557

(51) Int. Cl.
*G01L 7/14* (2006.01)
(52) U.S. Cl. ............................................ 73/740; 73/756
(58) Field of Classification Search .................. None
See application file for complete search history.

(56) References Cited

U.S. PATENT DOCUMENTS

| | | | | |
|---|---|---|---|---|
| 2,999,384 A * | 9/1961 | Johnson, Jr. | ................. | 73/708 |
| 3,926,055 A * | 12/1975 | Garnett | ................. | 73/720 |
| 3,982,437 A * | 9/1976 | Sekizawa | ................. | 73/730 |
| 4,552,153 A * | 11/1985 | Newman et al. | ................. | 600/490 |
| 4,586,388 A * | 5/1986 | Tanaka et al. | ................. | 73/862.582 |
| 5,561,247 A * | 10/1996 | Mutoh et al. | ................. | 73/724 |
| 5,571,970 A * | 11/1996 | Mutoh et al. | ................. | 73/724 |
| 6,912,910 B2 * | 7/2005 | Miyashita | ................. | 73/718 |
| 2010/0154552 A1 * | 6/2010 | Miyashita | ................. | 73/718 |

FOREIGN PATENT DOCUMENTS

| | | |
|---|---|---|
| DE | 8407654.7 U1 | 2/1985 |
| DE | 8015715 U1 | 11/1986 |
| DE | 9000876 U1 | 5/1990 |
| DE | 4407967 A1 | 5/1995 |
| DE | 20120593 U1 | 4/2002 |

* cited by examiner

*Primary Examiner* — Andre J Allen
(74) *Attorney, Agent, or Firm* — Baker & Hostetler LLP

(57) ABSTRACT

The invention relates to a pressure gauge having a cylindrical housing to which a bushing is fixed, which penetrates the housing. The pressure gauge is furthermore provided with a pressure sensor together with an allocated electronic evaluation unit, said sensor is operatively connected to a pressure port coaxially positioned to the longitudinal axis of the housing. A turnable adjustment pin to engage with an adjustment device of the electronic evaluation unit in the pressure gauge is accommodated in the bushing in a liquid-proof manner, and is equipped with holding means by means of which it is undetachably secured to the bushing.

16 Claims, 3 Drawing Sheets

PRESSURE GAUGE

CROSS-REFERENCE TO RELATED APPLICATIONS

This application claims priority to foreign Patent Application DE 10 208040557.4, filed on Jul. 18, 2009, the disclosure of which is incorporated herein by reference in its entirety.

FIELD OF THE INVENTION

The invention relates to a pressure gauge and even more precisely to a pressure gauge having a turnable adjustment pin to engage with an adjustment device of an electronic evaluation unit in the pressure gauge.

BACKGROUND OF THE INVENTION

As can be seen in FIG. 3, an absolute pressure gauge having a capsule element as pressure element, wherein the zero point of a measurement display can be adjusted in a mechanical way after a test vacuum has been applied, is known. The zero point adjustment according to said state of the art is effected by means of a pinion engaging with a gearwheel which is part of a display adjustment device of a manometer. The pinion is turnably accommodated in a mount which is inserted into an outer casing of the manometer and is fixed to it by means of welding before the manometer is assembled. An O-ring between the pinion and the mount seals the manometer, and a threaded nut screws the one end of the pinion where a thread is provided to a sidewall of the mount, in order to fasten and secure the pinion.

In order to enable a zero point adjustment in the above described absolute pressure gauge according to the state of the art, the threaded nut must be loosened before the pinion can be turned, i.e. before the zero point can be adjusted. This leads to the fact that the adjustment procedure of the manometer is time-consuming and tedious.

Furthermore, the pinion must be inserted into the mount before the manometer is assembled, said mount is then positioned in a bore hole in the outer casing of the manometer and is then welded to the outer casing.

This special design of the manometer requires a manual-labor-intensive assembly of the individual components consisting in many single and individual steps. Therefore, a production process of the absolute pressure gauge becomes labor-intensive and thus expensive.

Thus, it is the object of the invention to provide a simple and quickly to adjust pressure gauge. In accordance with the invention, this object is achieved by means of a pressure gauge having the features of claim 1.

SUMMARY OF THE INVENTION

Embodiments of the present invention advantageously provide a pressure gauge comprising a cylindrical housing to which a bushing is fixed, which penetrates the housing through a bore hole in the housing, wherein a clearance fit between the bushing and the bore hole is provided. The material of the housing as well as of the bushing is preferably steel, and the bushing is preferably fixed by means of welding. It is, however, also possible that the bushing or the housing are made from another material, for example the housing can be made from a metal and the bushing can be made from a plastic. In this case the bushing is fixed to the housing by means of pressing in or similar.

The pressure gauge according to embodiments of the present invention furthermore comprises at its inside a pressure sensor having an allocated electronic evaluation unit, wherein the pressure sensor is functionally connected to a pressure port which transmits the pressure of a system to be measured to the pressure sensor. Thereby, the pressure port runs coaxially to the longitudinal axis of the cylindrical housing and is preferably connected to the housing of the pressure gauge by means of welding.

A turnable adjustment pin is provided to engage with an adjustment device of the above mentioned electronic evaluation unit. The adjustment pin is accommodated in the bushing, wherein it is preferably inserted into the bushing from the outside. Furthermore, the adjustment pin is equipped with holding means by means of which it is undetachably secured to the bushing. These holding means preferably consist in latching means by means of which the adjustment pin is positively fit in the bushing. Said latching means can be provided in a way that at least one latching element at one end of the adjustment pin grips behind a shoulder at one end of the bushing, wherein the latching element can comprise the whole circumference or alternatively only a section thereof.

When assembled, the adjustment pin is positioned coaxially to the bushing and is preferably aligned with the outer wall of the housing. That means that the adjustment pin reaches in the axial direction of the bushing not further than the extreme front surface thereof. Thus, it is possible that the adjustment pin is preferably covered by a sticker or similar, which can be partially or completely transparent. Said sticker avoids an unintentional adjusting of the adjustment device by means of the adjustment pin, as well as an accumulation of foreign particles at the bushing or at the adjustment pin.

In order to achieve a liquid-tight accommodation of the adjustment pin, a sealing element is preferably provided between the adjustment pin and the bushing, for example an O-ring or similar. Said sealing element can be provided in a groove at the outer circumference of the adjustment pin or, as an alternative, in a groove at the inner circumference of the bushing. It is furthermore possible that none of these two coaxial components is provided with a groove and that the sealing element is pressed in between the components. The presence of a sealing element, as described above, also has the advantage that position tolerances between the housing and the adjustment device can be compensated.

Furthermore, the adjustment pin is preferably provided with a coupling element at one end positioned towards the inside of the pressure gauge, said coupling element serves to engage with the adjustment device of the electronic evaluation unit, wherein the adjustment device is for example a potentiometer or similar. Said coupling element can be, among other things, a longish nose which can engage with a corresponding slot-like recess in the adjustment device. The recess can alternatively have any other shape, as for example a cross-recess. It is also possible that the coupling element of the adjustment pin is a recess of any optional shape and the counterpart at the adjustment device is a correspondingly shaped nose, so that they can engage with each other.

In addition, the adjustment pin is preferably provided with a tool holder at one end positioned towards the outside of the housing, for example slot- or cross-shaped recesses, so that it is possible to engage a tool, for example a slotted screwdriver or a crosshead screwdriver, with the adjustment pin, so that it can be actuated. In this way, it is possible to transmit a turn of the tool to the adjustment device, wherein a liquid-tight sealing of the housing is maintained by means of the sealing element.

Furthermore, a liquid-tight, but gas permeable device is preferably provided at the pressure gauge in order to enable a pressure compensation between the inside of the housing and the environment. Said device which is permeable to gases can be provided at any position in the housing or alternatively at the bushing.

When assembled, the bushing is preferably positioned in the cylindrical housing at right angles to the longitudinal axis of the cylinder. Alternatively, the bushing can also be provided in the cylindrical housing in parallel with the longitudinal axis of the cylinder.

In the following, the invention is further explained by means of an embodiment and with reference to the figures.

DETAILED DESCRIPTION

Figures 1A, 1B:
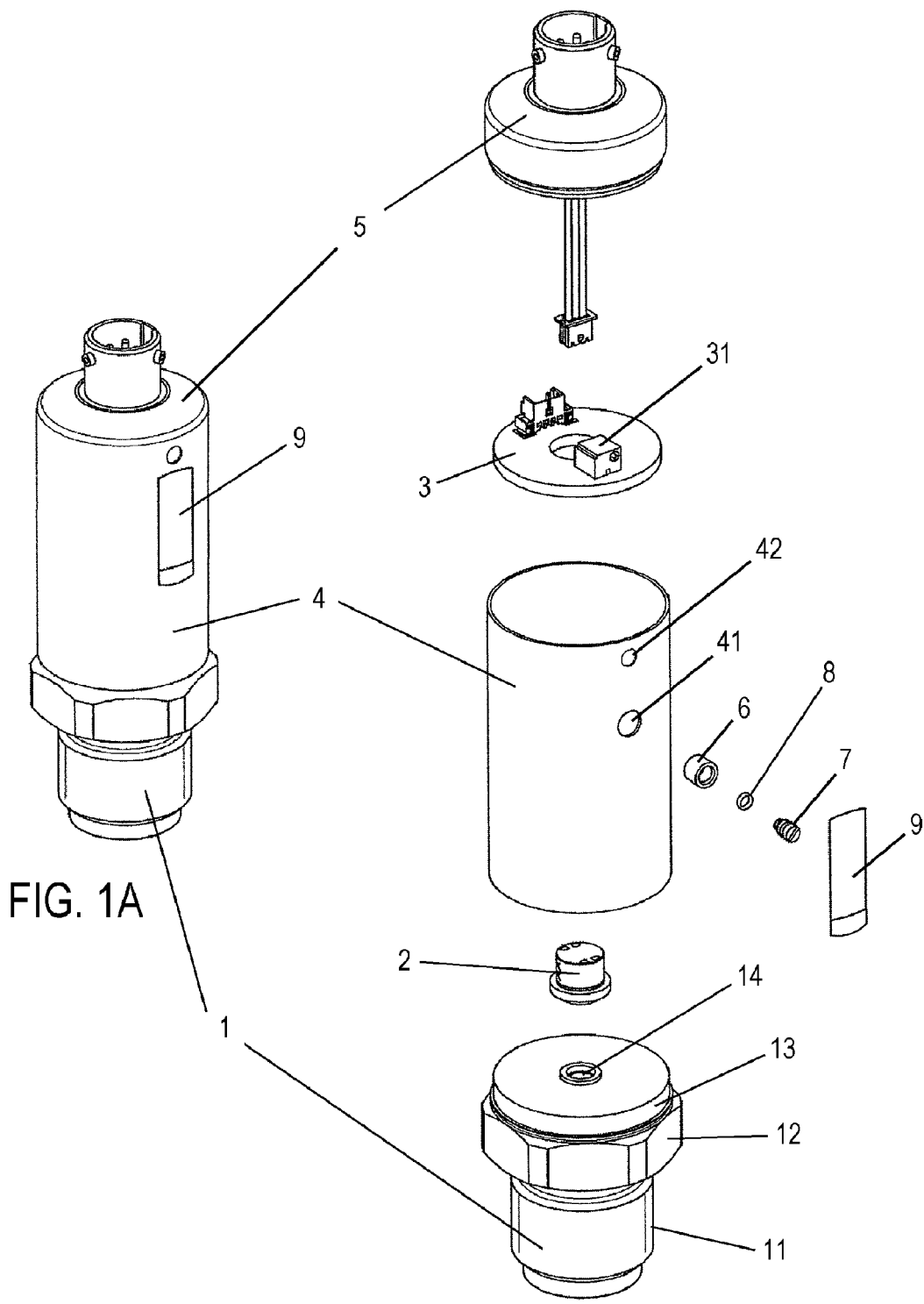
FIG. 1A shows a view of the assembled pressure gauge according to the preferred embodiment of the invention.
FIG. 1B shows an exploded view of the pressure gauge according to the preferred embodiment of the invention.

The pressure gauge shown in FIGS. 1A and 1B mainly comprises a pressure port 1, a pressure sensor 2, an electronic evaluation unit 3, a cylindrical metal housing 4 and a plug-in coupling element 5. The pressure port 1 of this embodiment comprises a screw-joint element 11, an actuating element 12 and a socket 13. The screw-joint element 11 serves to connect the pressure port 1 to a respective counterpart of a pressure system to be measured by means of a screw connection. The actuating element 12 in this embodiment is hexagon-shaped in order to enable an engagement with a tool, as for example a hexagon screwdriver. The pressure port 1 has a centered feedthrough hole 14 which opens at one end of the pressure port 1 in the center of the socket 13.

In order to measure a pressure of the above mentioned pressure system, a pressure sensor 2, as for example a piezoelectric pressure sensor, a thin-film pressure sensor, a thick-film pressure sensor, a ceramic pressure sensor or similar is provided above the feedthrough hole 14 and fixed to the socket 13 of the pressure port 1 by means of welding or similar. The pressure sensor 2 is electrically connected to an electronic evaluation unit 3, which is provided in the housing 4 above the pressure sensor. The electronic evaluation unit 3 holds a potentiometer which is an adjustment device 31 for adjusting a zero point of the electronic pressure measurement.

The pressure sensor 2 detects a measuring pressure of the pressure system present at the pressure sensor in form of a mechanical distortion, which is recorded by the electronic evaluation unit 3 and then transformed into an electrical signal. In order to be able to transmit said electric signal to the outside, the pressure gauge is provided with a plug-in coupling element 5, which is electrically connected to the electronic evaluation unit 3 and to which a plug-in connection of a peripheral device can be connected.

Figure 2:
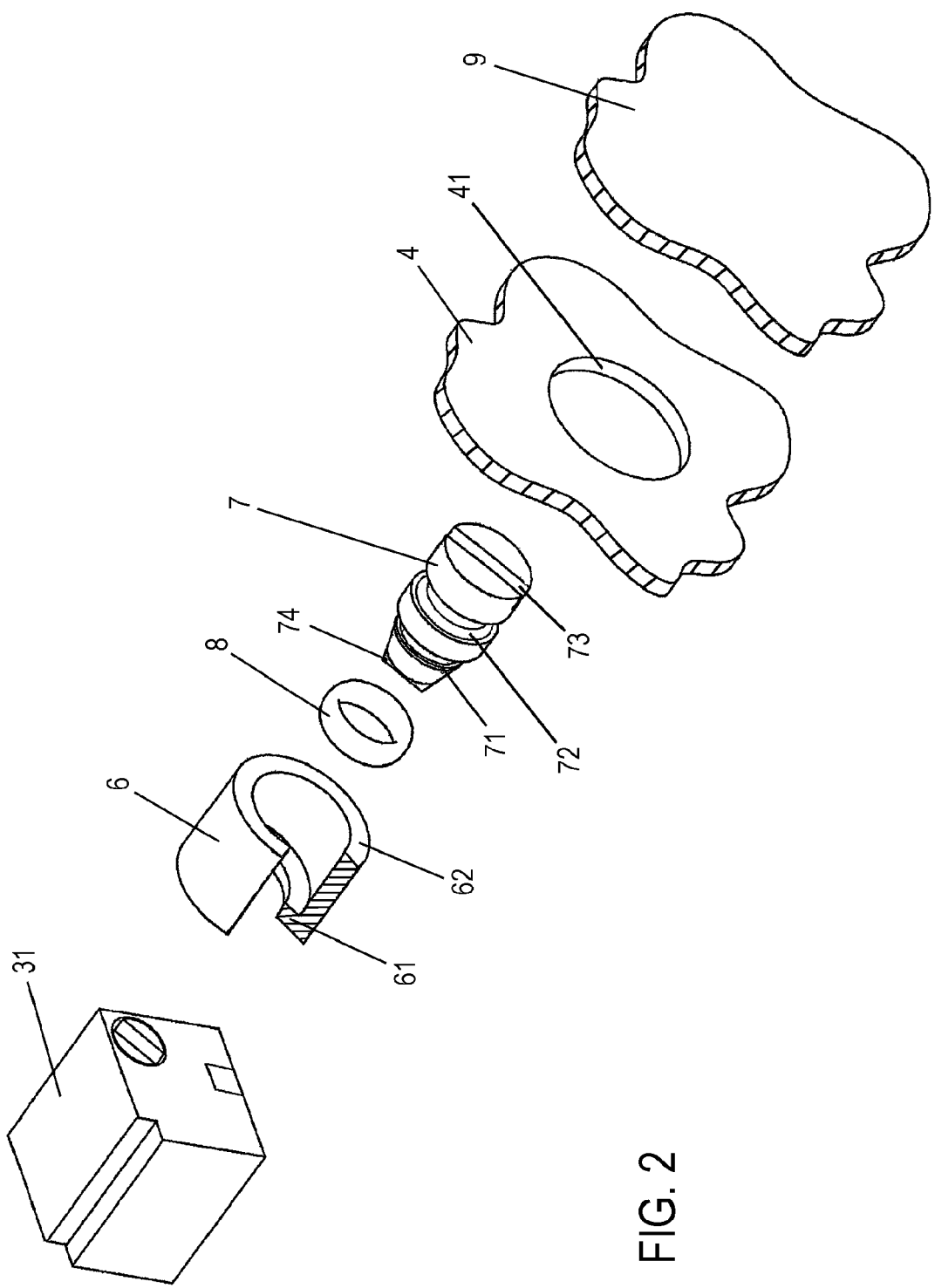
FIG. 2 shows a detailed exploded view of the adjustment mechanism and a sectional view of the bushing according to the preferred embodiment of the invention.
Figure 3:
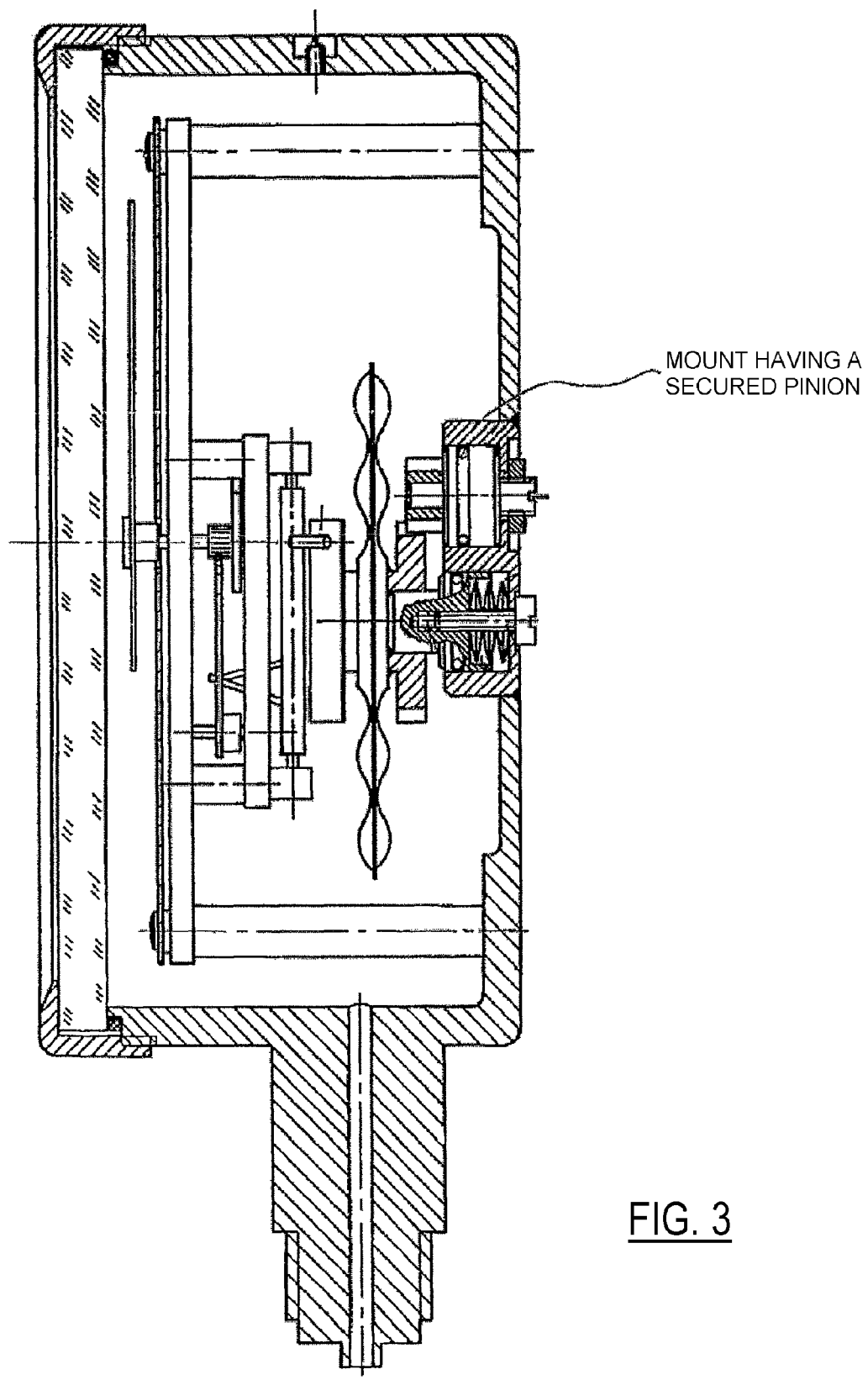
FIG. 3 shows a view of an absolute pressure gauge according to the state of the art.

In order to perform a zero point adjustment of the pressure gauge by means of the adjustment device 31, a cylindrical metal bushing 6 is fixed to the housing 4 by means of welding, said bushing penetrates the housing 4 at right angles relative to the longitudinal axis of the housing through a bore hole 41 in the housing in a position located opposite the adjustment device 31 provided in the housing 4. As can be seen from FIG. 2, at one end of the bushing 6, which is positioned towards the inside of the housing 4, a circumferential shoulder 61 is provided at an inner circumference of the bushing 6.

Furthermore, an adjustment pin 7 is provided inside the bushing 6, which is inserted into the bushing 6 from the outside. The adjustment pin 7 is at one end, which is positioned towards the inside of the housing 4, provided with a circumferential latching element 71. When the adjustment pin 7 is inserted into the bushing 6 the latching element 71 grips behind the shoulder 61. Thus, the adjustment pin 7 is undetachably connected to the bushing 6 by means of a latching connection.

In the adjustment pin 7, also a circumferential groove 72 is provided, in which an O-ring is positioned, in order to accommodate the adjustment pin 7 in a liquid-tight manner in the bushing 6.

At its front side positioned towards the outside of the housing 4, the adjustment pin 7 is provided with a slot-shaped recess 73, which enables a tool, as for example a crosshead screwdriver, to engage with the adjustment pin 7. The adjustment pin 7 furthermore comprises at its front side positioned towards the inside of the housing 4 a slot-shaped nose 74, which engages—when the adjustment pin 7 is assembled—with the adjustment device 31. Thus, a zero point adjustment of the pressure measurement can be achieved from the outside of the pressure gauge by means of turning the adjustment pin 7 and that is by means of turning the adjustment device 31 without having to open the pressure gauge.

Since the adjustment pin 7 reaches in the assembled position not further than the outer front side 62 of the bushing 6, it is possible to attach a sticker 9 to the housing 4, which completely covers the adjustment pin 7 and the bushing 6, as is shown in FIG. 1A. In this way, the accumulation of foreign particles at the bushing 6 or at the adjustment pin 7 as well as an unintentional activating of the adjustment pin 7 and thus a displacement of the adjustment device 31 is avoided.

In order to enable a pressure compensation between the inside of the housing and the outside of the pressure gauge, a bore hole 42 having a liquid-proof diaphragm fixed inside, for example a Gore-Tex®-diaphragm, is provided in this embodiment at the housing 4, and represents a liquid-tight but gas permeable device 42.

A modification of the preferred embodiment can, in addition, comprise, when the adjustment pin 7 is assembled, an elastic component, as for example a spring or an elastic rubber component or similar, provided between a part of the adjustment pin 7 that is opposite the shoulder of the bushing and the shoulder of the bushing. Said elastic component has the effect of maintaining a spacing between the adjustment pin 7 and the adjustment device 31. An engagement of the coupling element of the adjustment pin 7 with the adjustment device 31 is only achieved in this kind of assembly by means of compressing or respectively stretching the elastic component. Thus, the transmission of an unintentional turning of the adjustment pin 7 to the adjustment device 31 can be avoided.

A further possible modification of the above described embodiment may comprise that the bushing 6 is positioned in parallel with the longitudinal axis of the housing 4, instead of being positioned at right angles.

The bushing 6 may also, in a further modification, when fixed to the housing, completely or partially protrude from the housing 4 to the outside. In this modification, the liquid-tight, but gas permeable device 42 can be provided at the bushing 6, for example in form of a Gore-Tex®-diaphragm, which is fixed in a bore hole that penetrates the bushing 6. Said bore hole should be located, with respect to the housing, in front of the O-ring 8, in order to secure a gas exchange between the inside of the housing and the environment.

The bushing 6 may, in a further modification of the preferred embodiment, be made from a plastic and be pressed into the housing 4. Here instead of the liquid-tight, but gas permeable device 42 a device integrated into the bushing 6, as for example a Gore-Tex®-element or respectively a Gore-Tex®-diaphragm integrated into the bushing, which takes over such function, can be applied.

Alternatively the O-ring 8 can be made from a Gore-Tex®-material and take over the functions of the liquid-tight, but gas permeable device 42. Thus, the device 42 is not required.

Furthermore, it is possible to produce the sticker 9 from a liquid-tight, but gas permeable material. Said sticker will then take over the function of the liquid-tight, but gas permeable device 42, after an adjustment procedure and consequent application of the sticker 9 on the housing 4 has been effected, and thus the O-ring is not required.

Alternatively to the above described modifications it is furthermore possible that the bushing 6 is made from a sintered material which is air permeable. Thus it is possible that the bushing 6 takes over the function of the gas permeable device 42.

The potentiometer can be a worm gear potentiometer or a slide potentiometer.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A pressure gauge, comprising:
   a cylindrical housing to which a bushing, which penetrates the housing, is fixed;
   a pressure sensor having an allocated electronic evaluation unit, and which is operatively connected to a pressure port being positioned coaxially to the longitudinal cylinder axis of the housing; and
   a turnable adjustment pin to engage with an adjustment device of the electronic evaluation unit in the measuring gauge,
   wherein the adjustment pin is accommodated, in a liquid-tight manner, inside the bushing and includes a holding means for undetachably fixing the adjustment pin to the bushing.

2. A pressure gauge according to claim 1, wherein the holding means is a latching means to positively secure the adjustment pin inside the bushing.

3. A pressure gauge according to claim 2, wherein the latching means includes at least one latching element at one end of the adjustment pin that grips behind a shoulder at one end of the bushing.

4. A pressure gauge according to claim 1, wherein a sealing element is provided between the adjustment pin and the bushing.

5. A pressure gauge according to claim 4, wherein the sealing element is an O-ring.

6. A pressure gauge according to claim 1, wherein the adjustment pin is inserted into the bushing from the outside.

7. A pressure gauge according to claim 1, wherein the bushing is welded to the housing.

8. A pressure gauge according to claim 1, wherein the adjustment pin is provided with a tool receiver at one end which is positioned towards the outside of the housing.

9. A pressure gauge according to claim 1, wherein the adjustment pin is provided with a coupling element to engage the adjustment device at one end which is positioned towards the inside of the pressure gauge.

10. A pressure gauge according to claim 1, wherein the adjustment device of the electronic evaluation unit is a potentiometer.

11. A pressure gauge according to claim 1, wherein a liquid-tight, gas permeable device is provided at the bushing to enable a pressure compensation between the inside of the housing and the environment.

12. A pressure gauge according to claim 1, wherein the bushing is positioned in the cylindrical housing at right angles to the longitudinal axis of the cylinder.

13. A pressure gauge according to claim 1, wherein the bushing is positioned in the cylindrical housing in parallel with the longitudinal axis of the cylinder.

14. A pressure gauge according to claim 1, wherein the adjustment pin is substantially aligned with the outside wall of the housing in an axial direction of the bushing.

15. A pressure gauge according to claim 14, wherein the adjustment pin is covered by a sticker.

16. A pressure gauge according to claim 1, wherein the housing is connected to the pressure port by welding.

* * * * *